(12) United States Patent
Takanashi

(10) Patent No.: US 6,179,091 B1
(45) Date of Patent: Jan. 30, 2001

(54) WEAR DETECTION PROBE FOR A BRAKE PAD

(75) Inventor: Hitoshi Takanashi, Yokkaichi (JP)

(73) Assignee: Sumitomo Wiring Systems, Ltd. (JP)

( * ) Notice: Under 35 U.S.C. 154(b), the term of this patent shall be extended for 0 days.

(21) Appl. No.: 09/245,239

(22) Filed: Feb. 5, 1999

(30) Foreign Application Priority Data

Feb. 18, 1998 (JP) .................................................. 10-036475

(51) Int. Cl.[7] .................................................. F16D 66/00
(52) U.S. Cl. .................................................. 188/1.11 L
(58) Field of Search ..................... 188/1.11 W, 1.11 L, 188/1.11 R, 1.11 E; 340/453, 454; 73/121, 129, 130; 116/208; 200/61.4

(56) References Cited

U.S. PATENT DOCUMENTS

| 4,318,457 | * | 3/1982 | Dorsch | ................................. | 188/1.11 |
| 5,454,450 | * | 10/1995 | Tanigawa | ............................ | 188/1.11 |

FOREIGN PATENT DOCUMENTS

| 0 536 006 | 4/1993 | (EP) . |
| 2 485 133 | 12/1981 | (FR) . |
| 2 086 501 | 5/1982 | (GB) . |
| 62-66031 | 4/1987 | (JP) . |
| 6-30543 | 6/1994 | (JP) . |
| 9-032873 | 2/1997 | (JP) . |

* cited by examiner

Primary Examiner—Christopher P. Schwartz
Assistant Examiner—C. T. Bartz
(74) Attorney, Agent, or Firm—Anthony J. Casella; Gerald E. Hespos; Michael J. Porco

(57) ABSTRACT

A wear detection probe for a braking element includes a holder with opposed front and rear ends. A portion of the holder near the front end is configured to retain a detection wire. Thus, after sufficient wear of the brake and the holder, the detection wire will be broken to produce a signal indicative of brake wear. The holder includes two arrangement grooves extending from the abradeable portion of the detection wire to the rear end of the holder. The wear detection probe further includes a rib. The extreme rear end of the rib may include a slot, and a heat shrinkable tube may surround the wires and engage partly in the slot.

9 Claims, 4 Drawing Sheets

WEAR DETECTION PROBE FOR A BRAKE PAD

BACKGROUND OF THE INVENTION

1. Field of the Invention

The present invention relates to a wear detection probe or sensor for a brake pad.

2. Description of the Related Art

Wear detection probes are known for detecting when a brake pad of an automotive vehicle has been worn to an operating limit or to a degree that it cannot be used any longer. The known wear detection probe is shown in FIG. 5, and is identified by the numeral 1. The prior art probe 1 includes a detection wire 3 made integral to a resin holder 2 by insert molding. The detection wire 3 extends along an arrangement path through the holder 2 from its rear end to its front end. The detection wire 3 then is formed with a fold 3R at the front end surface of the holder 2 and extends back to the rear end.

The prior art wear detection probe 1 is accommodated in a brake pad 5 such that the folded portion 3R of the detection wire 3 faces a disk rotor 4 like a brake disk. As the wear of the brake pad 5 progresses, the wear detection probe 1 is exposed to a pad surface of the disk rotor 4 and, accordingly, the folded portion 3R of the detection wire 3 starts to abrade. When the wear of the brake pad 5 reaches its operating limit, the detection wire 3 is cut and a warning lamp (not shown) signals that the wear of the brake pad 5 has reached its operating limit.

The prior art wear detection probe 1 thus constructed has a problem of high production costs because the detection wire 3 is made integral to the holder 2 by insert molding.

In view of this problem, an object of the present invention is to reduce production costs.

SUMMARY OF THE INVENTION

According to the invention, there is provided a wear detection probe for a braking element, in which a detection wire is arranged in a path which substantially folds the detection wire at the front or abrasion end of a holder and extends to the rear end of the holder. Thus, wear of the braking element to its operating limit is detected when the folded portion of the detection wire is cut by a rotor. The wear detection probe includes at least one arrangement groove formed in the holder to extend substantially from the rear end of the holder to the folded portion of the detection wire. The detection wire is fitted or inserted in the arrangement groove. The wear detection probe further includes a restricting means for preventing the detection wire from coming out of the arrangement groove.

Since the wear detection probe is assembled by fitting the detection wire in the arrangement groove of the singly formed holder, production costs can be reduced as compared with the prior art wear detection probe in which the holder and the detection wire are made integral to each other by insert molding.

According to a preferred embodiment, the arrangement groove of the path is substantially formed in the outer surface of the holder. Although the detection wire is arranged in an arrangement groove that opens to an outer surface of the holder, the restricting means prevents the detection wire from coming out of the arrangement groove. Accordingly, the detection wire remains in the arrangement groove.

According to a further preferred embodiment, there is provided a wear detection probe for a braking element, in which a detection wire is arranged in a path which folds the detection wire at the front end of the holder and extends to the rear end of the holder. Wear of the braking element to its operating limit is detected when the folded portion of the detection wire is cut by the rotor. The wear detection probe includes at least one arrangement groove which is formed in the outer surface of the holder. The arrangement groove extends from the rear end of the holder to the location specified for the folded portion of the detection wire. The wire is fitted in the arrangement groove(s), and a restricting means is provided for preventing the detection wire from coming out of the arrangement groove(s).

Preferably, two arrangement grooves are formed, and the restricting means comprises a rib projecting from the rear end surface of the holder in a position to partition two extending portions of the detection wire extending from the arrangement grooves. A slit preferably is formed in the rib and opens in the rear edge of the rib. A connecting member is fitted or fittable through or into the slit and is adapted to connect the two extending portions of the detection wire at the opposite sides of the rib.

The two extending portions of the detection wire extending from the arrangement grooves are engaged with the rib by fitting the connecting member in the slit. Since the slit is open in the rear edge of the rib which intersects with the outer surface of the holder, the connecting member will not be disengaged from the slit. This prevents the detection wire from coming out of the arrangement grooves.

Preferably, the connecting member comprises a heat shrinkable tube, a rubber tube and/or a tube made out of soft resin that is fitted or fittable at least partly on the extending portions of the detection wire corresponding to the slit. Accordingly, the detection wire easily can be prevented from coming out of the arrangement grooves.

The slit preferably extends at an angle different from 0° or 180°, and most preferably substantially normal to the two extending portions of the detection wire that extend from the arrangement grooves.

According to a further preferred embodiment, the path comprises at least one through hole for substantially communicating with two or more arrangement grooves. The through hole is arranged at an angle different from 0° or 180°, and preferably substantially normal to the arrangement grooves and/or normal to the longitudinal direction of the holder. Accordingly, since the arrangement path in which the detection wire is fitted or arranged preferably is bent, a displacement of the detection wire can be prevented securely.

The path may further comprises a communication groove, which is open in the upper outer surface of the holder and which communicates between the upper sides of the through holes.

Further preferably, the folded portion is arranged substantially parallel to the front or abrasion end of the braking element and in a direction substantially normal to an axis of rotation of the rotor.

Most preferably, one or more extending portions of the detection wire extending from the one or more arrangement grooves are arranged at one or more heights being which are different from portions of the detection wire which are arranged in the arrangement grooves.

These and other objects, features and advantages of the present invention will become more apparent upon a reading of the following detailed description and accompanying drawings.

DETAILED DESCRIPTION OF THE PREFERRED EMBODIMENTS

Figure 1:
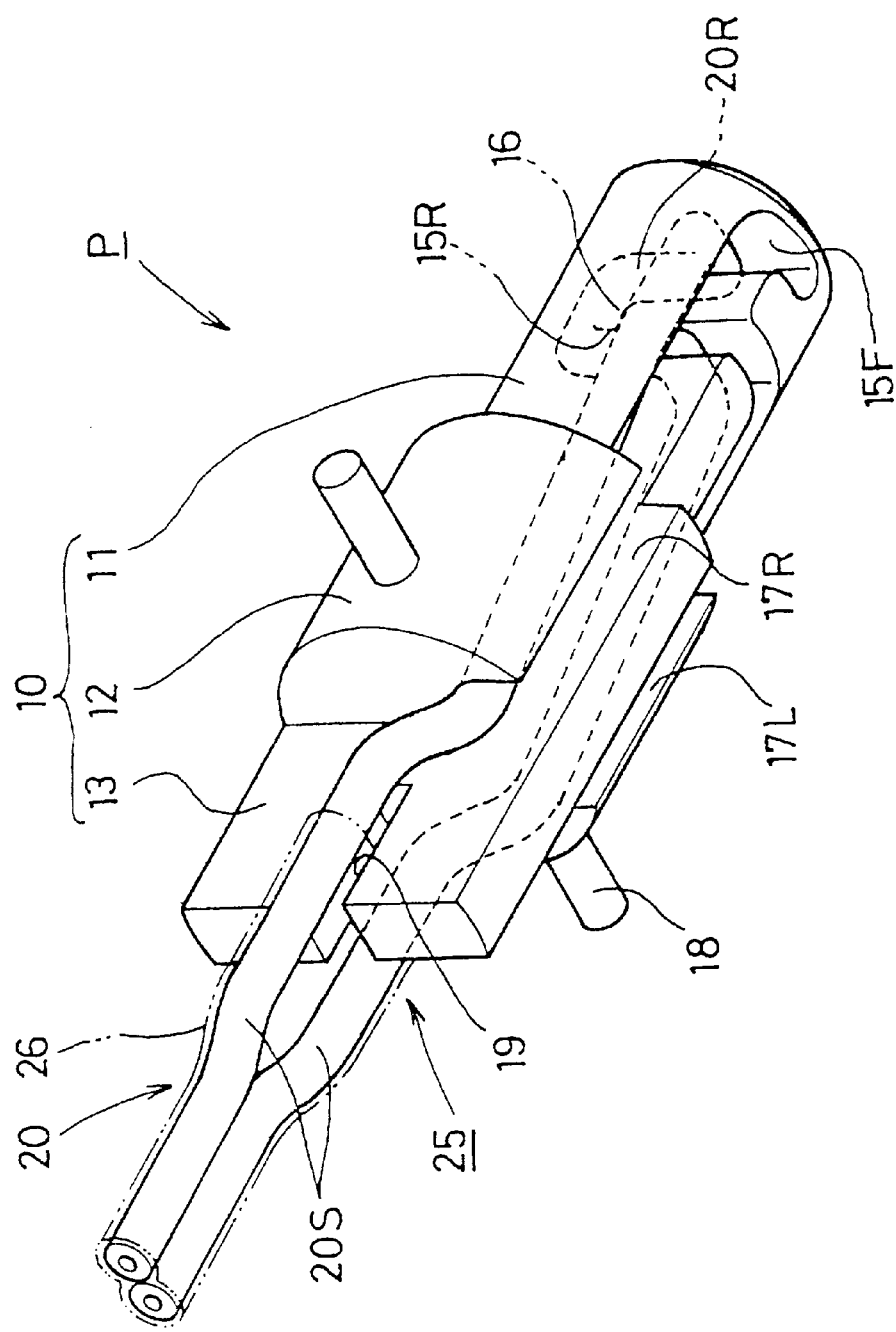
FIG. 1 is a perspective view of a wear detection probe according to a first embodiment of the invention.

Hereafter, one embodiment of the invention applied to a known disk brake of an automotive vehicle is described with reference to FIGS. 1 to 4. This disk brake is comprised of a brake lining member B (braking element) for pressing the opposite surfaces of a disk-shaped rotor R which is integrally rotated with an unillustrated wheel. The disk brake further compromises a support member S to which the braking lining member B is fixed. The support member S and the brake lining member B are formed with mount holes Sh, Bh which are substantially aligned with each other. A wear detection probe or sensor P, according to this embodiment, is mounted or mountable in these mount holes Sh, Bh.

The wear detection probe P is comprised of a holder 10 and a known detection wire 20 obtained e.g. by resin-coating a metal braided wire.

The holder 10 is made of a heat resistant resin material and is an integral or unitary assembly of a cylindrical portion 11, an enlarged portion 12 and a rib 13. The enlarged portion 12 is substantially continuous with the rear end of the cylindrical portion 11 and is substantially concentric with the cylindrical portion 12. The rib 13 preferably is in the form of a substantially rectangular plate and projects from the rear end of the enlarged portion 12. An arrangement path for arranging the detection wire 20 is formed in the cylindrical portion 11 and the enlarged portion 12.

The arrangement path includes two through holes 15F, 15R which extend in a direction at an angle different from 0° or 180°, preferably substantially normal to the longitudinal direction of the holder 10 at the front end of the holder 10. A communication groove 16 is open in the (upper) outer surface of the cylindrical portion 11 and substantially communicates between the (upper) sides of the through holes 15F, 15R. Two arrangement grooves 17L, 17R are substantially open in the (lower) outer surfaces of the cylindrical portion 11 and the enlarged portion 12. The arrangement grooves 17L and 17R individually extend backward from the lower openings of the through holes 15F, 15R, and are substantially open in the rear end surface of the enlarged portion 12. The detection wire 20 is arranged in the right arrangement groove 17R, the front through hole 15F, the communication groove 16, the rear through hole 15R and the left arrangement groove 17L in this order. It should be appreciated that the inner diameter and the width of the arrangement path are set substantially equal to the outer diameter of the resin coating of the detection wire 20.

Figure 2:
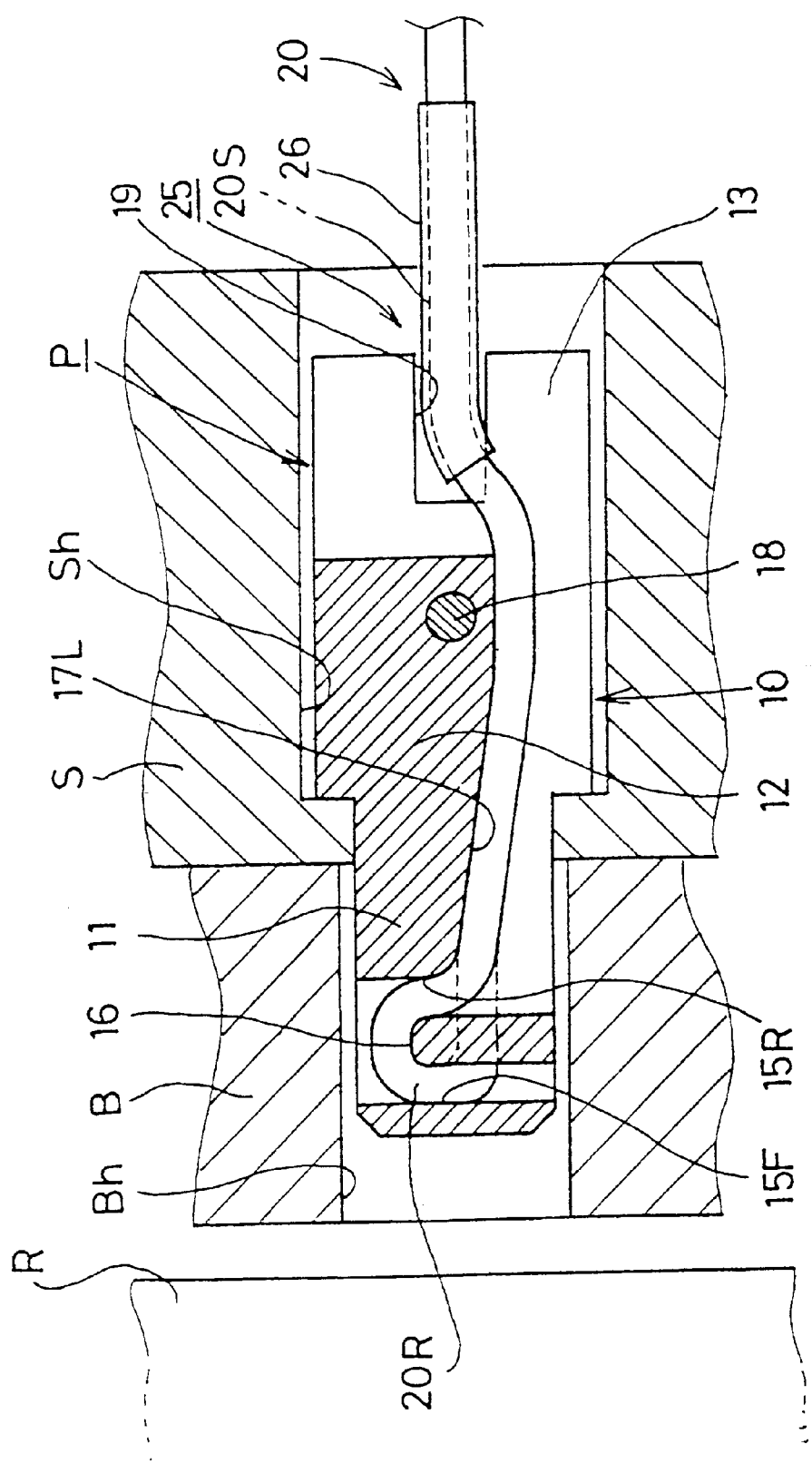
FIG. 2 is a section of the wear detection probe in its mounted state.
Figure 3:
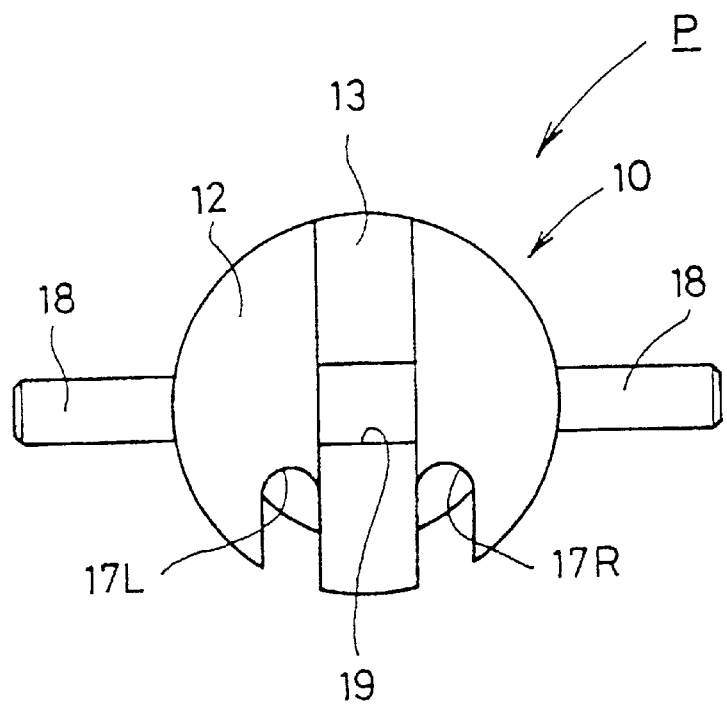
FIG. 3 is a rear view of the wear detection probe without a detection wire.

FIG. 2 is a section along the left arrangement groove 17L which communicates with the rear (right in FIG. 2) through hole 15R. The orientation of the wear detection probe P in FIG. 2 is laterally opposite from that in FIG. 1. Accordingly, although the right arrangement groove 17R is seen to be located more forward than the left arrangement groove 17L in FIG. 1, the right arrangement groove 17R cannot be seen in FIG. 2 in which the left arrangement groove 17L is shown because it is located behind the left arrangement groove 17L.

To mount the detection wire 20 in the arrangement path, the ends of the folded detection wire 20 are inserted through or into the front and rear through holes 15F, 15R from above the holder 10. A portion of the detection wire 20 that comes out of the front through hole 15F is fitted in the right arrangement groove 17R. A portion of the detection wire 20 that comes out of the rear through hole 15R is fitted in the left arrangement groove 17L. The portion of the detection wire 20 located in the front through hole 15F serves as a folded portion 20R. When the wear of the brake lining member B reaches its operating limit, the folded portion 20R is abraded with the front end of the cylindrical portion 11 to be consequently cut. Extending portions 20S of the detection wire 20 are exposed from the rear ends of the arrangement grooves 17L, 17R and extend backwardly along the left and right surfaces of the rib 13. The extending portions 20 are secured to an unillustrated terminal fitting and connected with an unillustrated breakage detecting circuit via a connector. Preferably, the extending portions 20S are arranged at a height or position which is substantially different from or offset from the portions of the detection wire 20 in the arrangement grooves 17L, 17R. In other words, the extending portions 20S are located below and/or above the portions of the detection wire 20 in the arrangement grooves 17L, 17R.

The wear detection probe P is mounted by a pair of mount pins 18 which project from the outer surface of the enlarged portion 12 such that the enlarged portion 12 and the rib 13 are accommodated in the mount hole Sh of the support member S and such that the cylindrical portion 11 is accommodated in the mount hole Bh of the brake lining member B. In this mounted state, the front end of the holder 10 faces the rotor R. At this time, the folded portion 20R of the detection wire 20 extends in the vertical direction of FIG. 2 which is substantially same as the rotating direction of the rotor R or a tangential direction of the rotor R with respect to its axis of rotation. When the thickness of the brake lining member B is reduced to a specified degree as the wear thereof progresses, the front end of the wear detection probe P and the folded portion 20R are abraded by the contact with the rotor R and, consequently, the detection wire 20 is cut. In this way, it is detected that the wear of the brake lining member B has reached its operating limit.

The holder 10 of this embodiment is provided with a restricting means 25 for preventing the detection wire 20 from coming out of the arrangement grooves 17L, 17R. This restricting means 25 preferably is comprised of the rib 13, a slit 19 formed in the rib 13 and a heat-shrinkable tubing 26 (connecting member).

The rib 13 is arranged to partition the two extending portions 20S of the detection wire 20 that extend from the arrangement grooves 17L, 17R. Thus the extending portions 20S extend along opposite surfaces of the rib 13. The slit 19 is formed to be open in the rear end of the rib 13 and extend along forward and backward or longitudinal directions. The heat-shrinkable tubing 26 is fitted to surround the two extending portions 20S together after the detection wire 20 is arranged in the holder 10. An end of the heat-shrinkable tubing 26 toward the holder 10 is deformed or treated to be held in the slit 19, and the heat-shrinkable tubing 26 is heated in this state. Then, the heat-shrinkable tubing 26 is so deformed as to reduce its diameter and is adhered to both extending portions 20S. In this way, the heat-shrinkable tubing 26 and the detection wire 20 are made substantially integral to each other.

Figure 4:
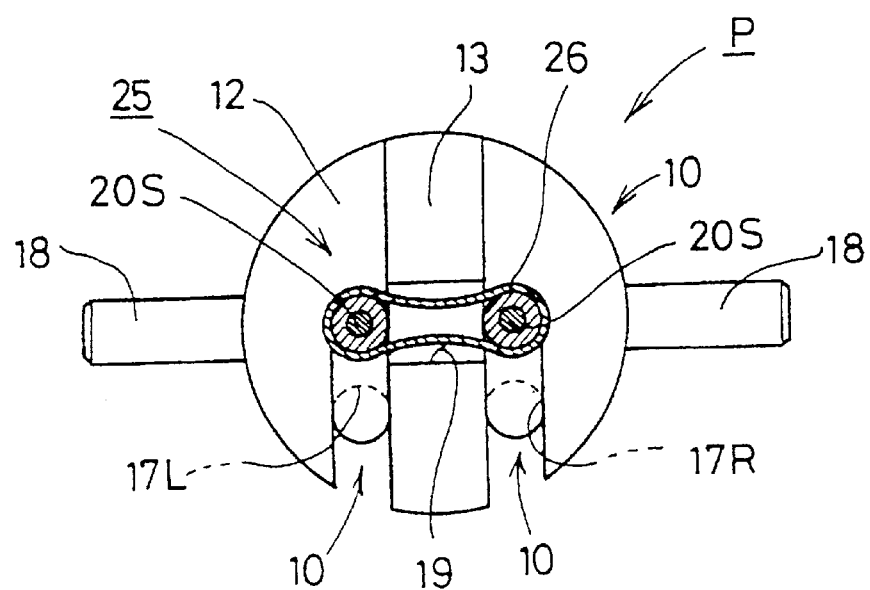
FIG. 4 is a rear view of the wear detection probe with the detection wire assembled.
Figure 5:
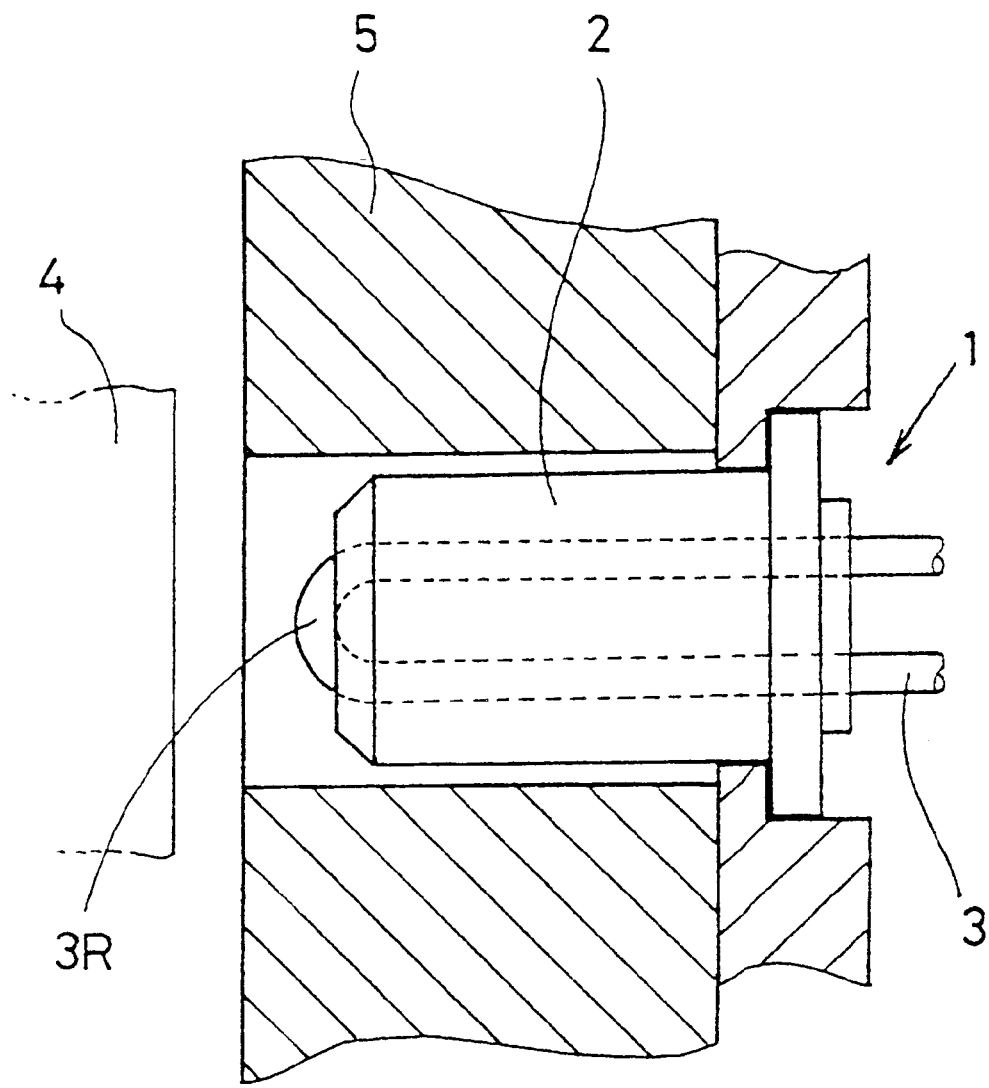
FIG. 5 is a section of a prior art wear detection probe.

In this state, the flat heat-shrinkable tubing 26 extends substantially horizontally or transversely in the slit 19 as shown in FIG. 4. In front of the slit 19, loose lateral movements of the two extending portions 20S split on the opposite sides of the rib 13 are restricted by the contact with the rib 13. Accordingly, the heat-shrinkable tubing 26 integral to the extending portions 20S cannot laterally move to come out of the slit 19. Loose vertical movements of the extending portions 20S (or movements thereof substantially in the plane of the rib 13) are restricted by the engagement of the heat-shrinkable tubing 26 and the slit 19. In other words, this prevents the detection wire 20 from coming down out of the arrangement grooves 17L, 17R.

Since the wear detection probe P according to this embodiment is of the type in which the detection wire 20 is fitted in the arrangement path of the singly formed holder 10, production costs are lower than the prior art wear detection probe in which the holder and the detection wire are made integral to each other by insert molding.

Although the detection wire 20 merely is fitted or inserted in the arrangement grooves 17L, 17R which are open in the outer surface of the holder 10, the detection wire 20 does not come out of the arrangement grooves 17L, 17R because the loose vertical movement of the detection wire 20 is restricted by fitting the heat-shrinkable tubing 26 integrally mounted on the detection wire 20 in the slit 19.

Further, since the arrangement path in which the detection wire 20 is fitted is bent, a displacement of the detection wire 20 can be prevented securely even if a pulling force acts on only one of the two extending portions 20S of the detection wire 20 in a backward direction.

Furthermore, since the two through holes 15F, 15R are so formed as to extend in a direction at an angle different from 0° or 180°, preferably substantially normal to the acting direction of the pulling force, the displacement of the detection wire 20 caused by the pulling force can be prevented more effectively as compared with the case where only one through hole is provided.

The through holes 15F, 15R of the arrangement path are short because they extend in a transverse direction of the holder 10. Thus the detection wire 20 is less likely to buckle and/or get caught during the insertion as compared with a case where the through holes 15F, 15R extend in the longitudinal direction of the holder 10. Further, since the arrangement grooves 17L, 17R extending in the longitudinal direction of the holder 10 are open in the outer surface of the holder 10, the detection wire 20 can be fitted or arranged easily. In other words, the detection wire 20 easily can be arranged in the arrangement path.

The present invention is not limited to the described and illustrated embodiment, but the following embodiments are also embraced by the technical scope of the present invention as defined in the claims.

Although the two arrangement grooves are exposed in the outer surface of the holder in the foregoing embodiment, only one arrangement groove may be exposed in the outer surface of the holder while the other may be formed inside the holder according to the invention.

Although the heat-shrinkable tubing is used as a connecting member in the foregoing embodiment, a rubber tube, a tube made of a soft resin or the like may be used according to the invention.

Although the restricting means is comprised of the rib, the slit and the connecting member in the foregoing embodiment, it may be an other means, such as taping, to cover the arrangement grooves according to the invention.

Although the two arrangement grooves are both located below the slit (or at a height that is not flush with or corresponding to the slit) in the foregoing embodiment, one arrangement groove may be located below the slit while the other may be located above the slit.

Although the folded portion of the detection wire is accommodated in the holder in the foregoing embodiment, the invention is also applicable to a case where the folded portion of the detection wire is exposed at the front end surface of the holder.

Besides the preceding embodiments, a variety of other changes can be made without departing from the scope and spirit of the invention as defined in the claims.

What is claimed is:

1. A wear detection probe for a braking element, having a holder with front and rear ends, a detection wire arranged in a path in the holder such that the detection wire has a fold in proximity to the front end of the holder, ends of the detection wire extending to the rear end of the holder, the probe detecting when the braking element has worn to its operating limit by detecting when the fold of the detection wire has been cut by a rotor, comprising:

at least two arrangement grooves formed in an outer surface of the holder to define a portion of the path and to extend substantially from the rear end of the holder to the fold, the detection wire being fitted in the arrangement grooves, the restricting means comprising a rib projecting at the rear end of the holder in a position to partition two extending portions of the detecting wire extending respectively from the arrangement groove, and a restricting means for preventing the detection wire from coming out of the arrangement grooves.

2. A wear detection probe according to claim 1, wherein a slit is formed in the rib and extends from a side of the holder having one arrangement groove to a side of the holder having the other arrangement groove, the slit being open at the rear of the holder, and wherein the restricting means comprises a connecting member which is fitted through the slit and adapted to connect the two extending portions at opposite sides of the rib.

3. A wear detection probe according to claim 2, wherein the connecting member comprises a tube at least partly fitted on the extending portions of the detection wire adjacent the slit.

4. A wear detection probe according to claim 3, wherein the tube is a heat shrinkable tube.

5. A wear detection probe according to claim 3, wherein the slit extends substantially normal to the two extending portions of the detection wire extending from the arrangement grooves.

6. A wear detection probe according to claim 1, wherein the path comprises through holes for providing communication between the arrangement grooves, the through holes being substantially normal to the arrangement grooves.

7. A wear detection probe according to claim 6, wherein the path further comprises a communication groove, which is open in an upper outer surface of the holder and communicates between upper sides of the through holes.

8. A wear detection probe according to claim 1, wherein the extending portions of the detection wire are offset from portions of the detection wire in the arrangement grooves.

9. A wear detection probe according to claim 1, wherein the fold is arranged substantially parallel to the braking element in a direction normal to an axis of rotation of the rotor.

* * * * *